United States Patent
Buchstaller et al.

(10) Patent No.: US 10,615,639 B2
(45) Date of Patent: Apr. 7, 2020

(54) ENERGY MANAGEMENT SYSTEM FOR CONTROLLING A FACILITY, COMPUTER SOFTWARE PRODUCT, AND METHOD FOR CONTROLLING A FACILITY

(71) Applicant: Siemens Aktiengesellschaft, Munich (DE)

(72) Inventors: Dominic Buchstaller, Roettenbach (DE); Thomas Lehmann, Erlangen (DE)

(73) Assignee: SIEMENS SCHWEIZ AG, Zurich (CH)

( * ) Notice: Subject to any disclaimer, the term of this patent is extended or adjusted under 35 U.S.C. 154(b) by 600 days.

(21) Appl. No.: 15/509,689

(22) PCT Filed: Aug. 12, 2015

(86) PCT No.: PCT/EP2015/068538
§ 371 (c)(1),
(2) Date: Mar. 8, 2017

(87) PCT Pub. No.: WO2016/037788
PCT Pub. Date: Mar. 17, 2016

(65) Prior Publication Data
US 2017/0256987 A1    Sep. 7, 2017

(30) Foreign Application Priority Data

Sep. 8, 2014  (DE) .................. 10 2014 217 929

(51) Int. Cl.
*H02J 13/00*    (2006.01)
*H02J 3/14*    (2006.01)
*G05B 15/02*    (2006.01)

(52) U.S. Cl.
CPC .......... *H02J 13/0062* (2013.01); *G05B 15/02* (2013.01); *H02J 3/14* (2013.01);
(Continued)

(58) Field of Classification Search
CPC .......... H02J 13/0062; H02J 3/14; G05B 15/02
See application file for complete search history.

(56) References Cited

U.S. PATENT DOCUMENTS 7,460,930 B1 * 12/2008 Howell ................. G01D 4/002
                                                              700/295
9,146,548 B2    9/2015 Chambers et al.
(Continued)

FOREIGN PATENT DOCUMENTS

| DE | 112010003256 T5 | 1/2013 | ............ G05D 29/00 |
| DE | 102012203121 A1 | 8/2013 | ............... H02J 3/00 |
| WO | 2016/037788 A1 | 3/1916 | ............... H02J 3/14 |

OTHER PUBLICATIONS

International Search Report and Written Opinion, Application No. PCT/EP2015/068538, 11 pages, dated Oct. 30, 2015.
(Continued)

*Primary Examiner* — Ronald D Hartman, Jr.
(74) *Attorney, Agent, or Firm* — Slayden Grubert Beard PLLC

(57) ABSTRACT

An energy management system is provided for controlling a controlled device connected to an energy supply network, which controlled device includes multiple energy-converting elements, wherein the sum of maximum energy conversions of the energy-converting elements is at least 3 kW. The energy management system may include modules that each provide functions used in the control of the controlled device, wherein planning function(s) for planning a future energy conversion of the energy-converting element(s), sensing function(s) for sensing parameter(s) that concern an instantaneous energy conversion of the energy-converting element(s), and control function(s) for specifying control parameter(s) that influence an energy conversion of the energy-converting element(s) are provided as functions. Each module may be designed to communicate with other
(Continued)

one(s) of the modules via a communication connection, whereby functions of the module can be used by the other module and/or functions of the other module can be used by the module.

12 Claims, 2 Drawing Sheets

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | | |
|---|---|---|---|---|
| 9,197,068 | B2* | 11/2015 | Nuqui | H02J 3/36 |
| 9,557,720 | B1* | 1/2017 | Woods | G01R 19/02 |
| 10,097,003 | B2* | 10/2018 | Nanda | H02J 3/382 |
| 10,141,886 | B2* | 11/2018 | Chernilevskyy | H02J 3/383 |
| 2008/0217471 | A1 | 9/2008 | Liu et al. | 244/1 R |
| 2010/0292856 | A1 | 11/2010 | Fujita | 700/291 |
| 2012/0139241 | A1* | 6/2012 | Haj-Maharsi | F03D 7/0224 290/44 |
| 2013/0155739 | A1* | 6/2013 | Itako | G05F 1/67 363/95 |
| 2014/0025217 | A1* | 1/2014 | Jin | H02J 13/0006 700/295 |
| 2014/0046495 | A1 | 2/2014 | Magnussen et al. | 700/291 |
| 2014/0070617 | A1* | 3/2014 | Detmers | H02J 3/32 307/64 |
| 2014/0288719 | A1* | 9/2014 | Kanayama | G05B 15/02 700/286 |
| 2014/0309800 | A1* | 10/2014 | Morin | H02J 3/14 700/295 |
| 2015/0263525 | A1* | 9/2015 | Fornage | H02J 3/14 307/35 |

OTHER PUBLICATIONS

German Office Action, Application No. 102014217929.7, 9 pages, dated May 5, 2015.
European Office Action, Application No. 15750709.6, 4 pages, dated Aug. 20, 2018.

* cited by examiner

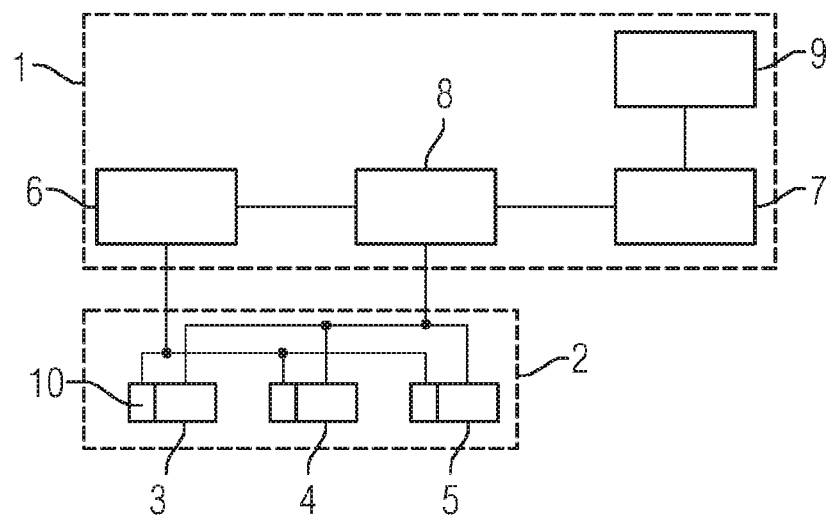
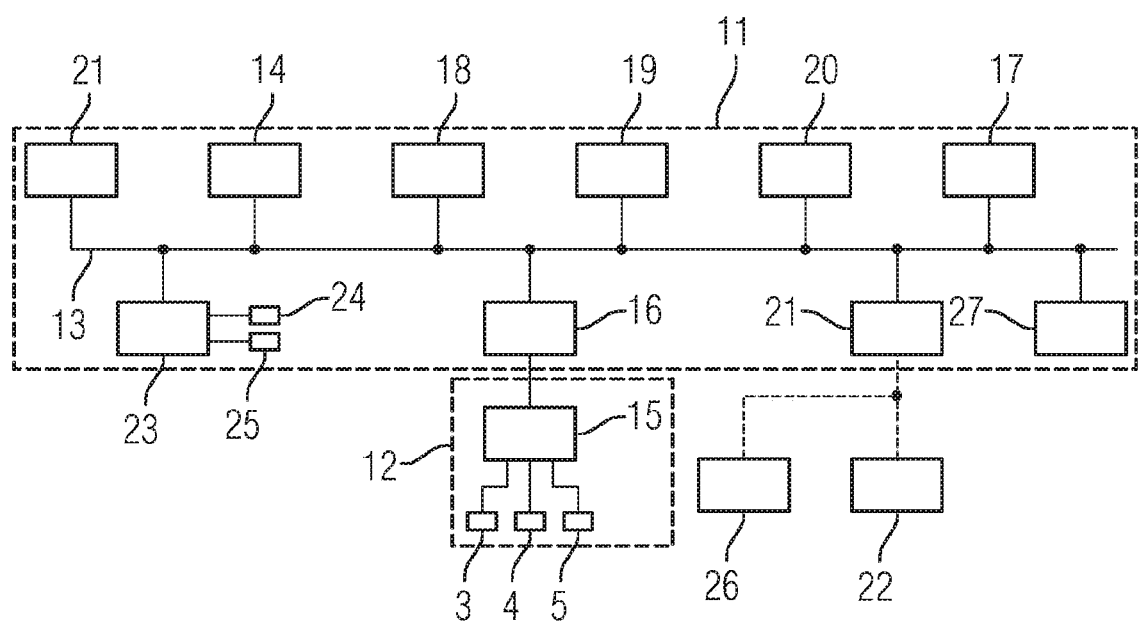

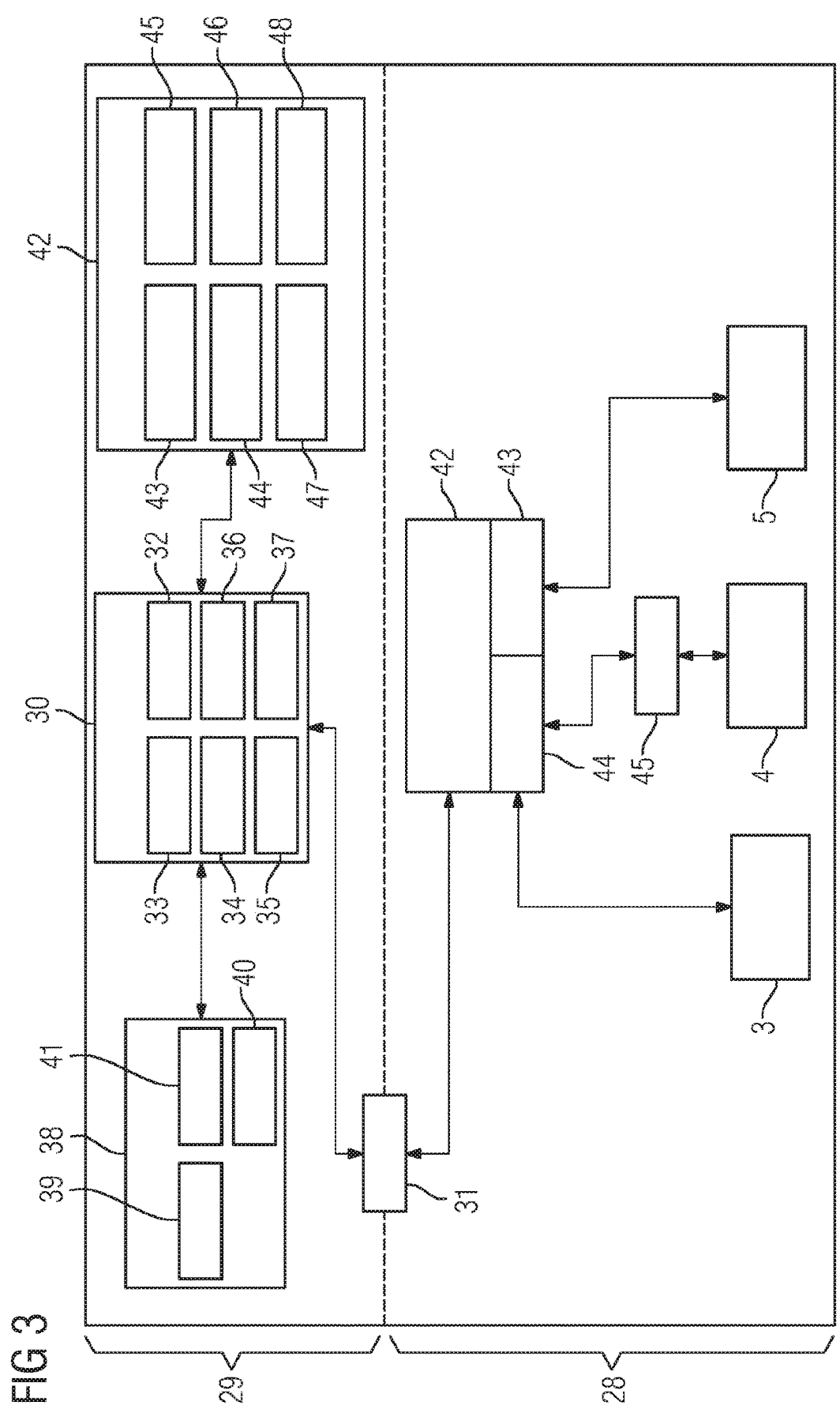

US 10,615,639 B2

ENERGY MANAGEMENT SYSTEM FOR CONTROLLING A FACILITY, COMPUTER SOFTWARE PRODUCT, AND METHOD FOR CONTROLLING A FACILITY

CROSS-REFERENCE TO RELATED APPLICATIONS

This application is a U.S. National Stage Application of International Application No. PCT/EP2015/068538 filed Aug. 12, 2015, which designates the United States of America, and claims priority to DE Application No. 10 2014 217 929.7 filed Sep. 8, 2014, the contents of which are hereby incorporated by reference in their entirety.

TECHNICAL FIELD

The invention relates to an energy management system for controlling a controlled facility that is connected to an energy supply grid and that has a plurality of energy converting elements, wherein the sum of the maximum energy conversions of the elements is at least 3 kW, and to a computer software product, and to a method for controlling a facility.

BACKGROUND

Large buildings and industrial plants frequently have automation systems that control the infrastructure of the large buildings and the industrial plants. Energy management systems, which serve to control the connected components in an energy-efficient manner, may be provided as part of these automation systems. If both energy generators such as, for example, photovoltaic installations, and energy loads are provided, the generation and the consumption of energy can be coordinated. Besides merely management of the electrical energy, further forms of energy such as, for example, gas, steam and district heating may additionally be included.

The said automation systems with integrated management systems are relatively complex, and typically have to be adapted for the individual application, such that the provision of these systems requires a high initial investment. Whereas it would be advantageous, for ecological and economic reasons, to provide an energy management system also for other controlled facilities, for example residential buildings, retail business and smaller industrial plants, this is frequently unattractive because of the high initial investment and the complexity of adapting the systems, mentioned at the outset, to the particular application. For this reason, in the context of automation of buildings, typically only automation systems that control and monitor exclusively individual items of equipment in an energy-efficient manner are used. Also known are systems that can control the operation of individual loads, for example a washing machine, in dependence on operating parameters of a photovoltaic system.

SUMMARY

One embodiment provides an energy management system for controlling a controlled facility that is connected to an energy supply grid and that has a plurality of energy converting elements, wherein the sum of the maximum energy conversions of the energy-converting elements is at least 3 kW, wherein the energy management system comprises a plurality of modules that each provide at least one function used in the course of controlling the controlled facility, wherein there are provided, as functions, at least one planning function for planning a future energy conversion of at least one of the energy-converting elements, at least one acquisition function for acquiring at least one acquisition parameter that relates to an instantaneous energy conversion of at least one of the energy-converting elements, and at least one control function for specifying at least one control parameter that influences an energy conversion of at least one of the energy-converting elements, wherein each of the modules is designed to communicate with respectively at least one other of the modules via a respective communication link, whereby functions of the module can be used by the other module and/or functions of the other module can be used by the module.

In one embodiment, the energy management system comprises at least one acquisition module for providing at least one of the at least one acquisition functions, at least one planning module for providing at least one of the at least one planning functions, and a control module for providing at least one of the at least one control functions.

In one embodiment, the modules are each to be realized as separate hardware component parts.

In one embodiment, the communication link is a communication network, wherein the modules each comprise a communication means for connecting to the communication network.

In one embodiment, at least three or all of the modules communicate via the communication network or one of the communication networks.

In one embodiment, the energy management system comprises, as at least one of the modules, a storage module that provides to at least one other of the modules functions for storing and/or calling-up data.

In one embodiment, the energy management system comprises, as at least one of the modules, a communication module that provides to at least one other of the modules at least one function for communicating with at least one facility that is external to the energy management system.

In one embodiment, the energy management system comprises, as at least one of the modules, a prognosis module that provides to at least one other of the modules at least one function for predicting at least one future value for an operating parameter of the controlled facility, wherein the operating parameter is determined by influences outside of the energy management system and the controlled facility.

In one embodiment, the energy management system comprises, as at least one of the modules, an optimization module that provides to at least one other of the modules at least one function for optimizing, dependent on at least one predefined boundary condition, at least one operating parameter that relates to the energy conversion of the controlled facility.

In one embodiment, the energy management system comprises, as at least one of the modules, an operating module that provides to at least one other of the modules at least one function for outputting data to a user via an output device, and/or that acquires user inputs to an operating means, and that is designed to call up at least one function of at least one other of the modules in dependence on the operating inputs.

Another embodiment provides a computer software product, comprising a plurality of differing computer programs, wherein, in the case of the computer programs being executed on respectively at least one processor unit and these processor units being interconnected in a communication network, the interconnected processor units realize an energy management system as disclosed above, wherein each processor unit constitutes a module that provides at least one function of the energy management system, wherein each of the modules is designed to communicate with respectively one other of the modules via the communication network, whereby functions of the module can be used by the other module and/or functions of the other module can be used by the module.

Another embodiment provides a method for controlling, by an energy management system, a controlled facility that is connected to an energy supply grid and that has a plurality of energy converting elements, wherein the sum of the maximum energy conversions of the elements is at least 3 kW, wherein the energy management system comprises a plurality of modules by which the respectively at least one function used in the course of controlling the controlled facility is provided, wherein there are provided, as functions, at least one planning function by which a future energy conversion of at least one of the energy-converting elements of the controlled facility is planned, at least one acquisition function by which the at least one acquisition parameter that describes an energy conversion of at least one of the energy-converting elements is acquired, and a control function by which at least one control parameter that influences an energy conversion of at least one of the energy-converting elements is predefined, wherein each of the modules communicates with respectively at least one other of the modules via a communication link, whereby functions of the module are used by the other module and/or functions of the other module are used by the module.

BRIEF DESCRIPTION OF THE DRAWINGS

Example aspects and embodiments of the invention are described below with reference to the drawings, in which:
FIG. 1 shows an example energy management system according to a first embodiment;
FIG. 2 shows an example energy management system according to a second embodiment; and
FIG. 3 shows an example energy management system according to a third embodiment.

DETAILED DESCRIPTION

Embodiments of the invention provide an energy management system for a controlled facility that, in comparison therewith, is an improved system that, in particular, is easily adapted to the requirements of differing controlled facilities.

Some embodiments provide an energy management system of the type stated at the outset, wherein the energy management system comprises a plurality of modules that each provide at least one function used in the course of controlling the controlled facility, wherein there are provided, as functions, at least one planning function for planning a future energy conversion of at least one of the energy-converting elements, at least one acquisition function for acquiring at least one acquisition parameter that relates to an instantaneous energy conversion of at least one of the energy-converting elements, and at least one control function for specifying at least one control parameter that influences an energy conversion of at least one of the energy-converting elements, wherein each of the modules is designed to communicate with respectively at least one other of the modules via a respective communication link, whereby functions of the module can be used by the other module and/or functions of the other module can be used by the module.

Some embodiments provide individual functions of an energy management system by modules that encapsulate a corresponding functionality, such that they can be used by the other modules, or functions, without knowledge of the internal structure of the function. The provision of communication links between a module and respectively at least one other module enables functions provided by the module to be used by the other module, and vice versa. Owing to the distribution, according to the invention, of the functionality of the energy management system to a plurality of modules, the energy management system can very easily be adapted to differing requirements. In addition to the described core functions, i.e. at least one planning function, at least one acquisition function and at least one control function, further functions may be provided for the energy management system, in that further modules are added. For example, if data is to be acquired from a plurality of sources, it is possible, in addition, to add corresponding acquisition modules. Control tasks can also be distributed to differing control modules. As explained in greater detail later, a multiplicity of further functions may also be provided by additional modules in the energy management system.

The individual functions of the energy management system may be implemented in such a manner that they use particular other functions of the energy management system if the latter are available. If another function is not available, the respective function may be adapted such that it does not use this other function. For example, instead of a return value of the other function, a predefined standard value may be used, or an alternative function may be called up. A corresponding configuration that specifies which functions are available may be generated dynamically and automatically. However, they may also be predefined during the installation of the energy management system.

The described modular structure of the energy management system makes it possible to make available, for individual functions, a plurality of modules that provide a corresponding functionality, to integrate into an energy management system one of a plurality of alternative modules for providing a particular function, for example in order to implement planning functions with differing complexity, and to use only modules that implement functions that are actually required for controlling the controlled facility. The modular structure thus enables the energy management system to be adapted to the respectively controlled facility in a favorable and simple manner. Moreover, new functionalities of the energy management system can be retrofitted particularly easily in the case of changes to the controlled facility, or a change in the requirements for the energy management system.

The functions of the energy management system may be implemented, in particular, as services of a service-oriented architecture. Accordingly, the functions may be, in particular, concluded, used independently, provided via a network, have a well-defined interface, and/or such that they can be used in a platform-independent manner. In this case the dependences between the various functions should be largely reduced and, as described above, a selection of which of the functions is used may be effected dynamically, during operation of the energy management system.

The energy-converting elements may each consume energy from the energy supply grid and/or provide energy to the energy supply grid. The energy management system can both coordinate the internal consumption and the internal provision of energy, and coordinate the energy consumption, or the energy provision, with a facility that is assigned to the energy supply grid and operated, for example, by an energy supplier. Energy-converting elements that have a particularly high energy consumption may be operated, for example, at times at which there is a large infeed by other energy generators that are external to the facility, or at which there is a low consumption by loads that are external to the facility. This also applies, conversely, to provision of energy to the energy supply grid by the controlled facility.

The functions provided by the modules can be used, on the one hand, by further functions of the same module, and/or by further functions of another of the modules. In addition, at least some of the functions may be triggered by external events. In particular, at least some of the functions may be used at particular instants and/or at particular intervals of time. An event-based function use is also possible. Thus, for example, an acquisition function may be called up if the value to be acquired goes outside a predefined interval.

Planning of a future energy conversion, as provided for in the disclosed energy management system, makes it possible to achieve better coordination of the energy-converting elements of the controlled facility, it being possible, in particular, to take account of particular boundary conditions. For some of the energy-converting elements, for example heating systems and air-conditioning systems, it can be possible to vary the time course of the energy conversion without appreciably lessening the use of the controlled facility. Planning of the future energy conversion makes it possible, for example, to effect coordination with energy-converting elements, for example a photovoltaic installation, in the controlled facility.

Planning of a future energy conversion additionally makes it possible to coordinate with facilities on the energy-supply grid side, such that an operator of a supply grid can be informed in advance of prospective effected energy conversions. Planning may be effected, in particular, for a predefined time interval distant from the planning time-point. For example, planning may be effected for a 24-hour time interval, the planning time-point being 12 hours before commencement of this time interval. The planning function may also be used to effect planning for a plurality of time intervals, in particular of differing length, or a plurality of planning functions may be provided, the provision being effected, in particular, by differing modules, and/or planning being effected for differing time intervals.

The specification of the control parameter by the control functions may be effected in dependence on an energy conversion, for the respective energy-converting element and/or for further energy-converting elements, that is planned beforehand by the planning function for the instantaneous point in time, or the instantaneous time interval. In particular, the specification of the control parameter may be effected with the aim of matching the energy conversion of the entire controlled facility to the planned energy conversion for the entire controlled facility. The specification of the control parameter may additionally be effected in dependence on at least one acquisition parameter provided by the acquisition function. Frequently, it is not possible to specify the exact energy conversion of all energy-converting elements solely by specifying control parameters. Some of the energy-converting elements may be such that they can be operated manually, either partly or fully, and/or their energy conversion may be dependent on external factors, for example the weather. Acquiring acquisition parameters that relate to the instantaneous energy conversion of such energy-converting elements makes it possible, as part of the control function, to specify a control parameter, for these or other energy-converting elements, that compensates these incalculables.

In some embodiments, the energy management system comprises at least one acquisition module for providing at least one of the at least one acquisition functions, at least one planning module for providing at least one of the at least one planning functions, and a control module for providing at least one of the at least one control functions. In particular, at least some of the modules of the energy management system may provide precisely one function. Alternatively, a plurality of, or all, functions of the same type, for example a plurality of all of the planning functions may be provided by a single one of the modules.

The modules may each be realized as separate hardware component parts. They may be such that they can be disposed in separate housings and can be used separately from each other. Individual modules, or all of the modules, may be at a distance from each other, such that, in the disclosed energy management system, individual modules or groups of modules may be used at differing locations that are at a distance from each other. For example, some of the modules may be integrated in a switchgear cabinet, and some of the modules in a computer center and/or at a user workplace that is at a distance therefrom.

The communication link may be a communication network, wherein the modules each comprise a communication means for connecting to the communication network. The communication network may be a wireless network, a wired network, or a network that is partly wired and partly wireless. The network protocol may be a standard protocol such as, for example, TCP/IP. For the purpose of providing the functions of the modules to respectively other modules, it is advantageous if the functions are implemented as functions that can be called up via a network. This is possible, for example, via SOAP. However, it is also possible to use network protocols that already support the setting of object properties, or the calling-up of functions via the network, for example BACnet or OPC OA.

Advantageously, at least three or all of the modules communicate via the communication network or one of the communication networks. In particular, if at least some of the modules are to provide functions that are provided by them to a plurality of the other modules, implementation of separate paired communication links between the modules would be relatively elaborate, and the use of the common communication network is advantageous.

In some embodiments, the energy management system may comprise, as at least one of the modules, a storage module that provides to at least one other of the modules functions for storing and/or calling-up data. In particular, a storage module may provide functions of a database to the further modules. It is also possible, however, to provide functions for free access for reading and/or writing data, or to provide write accesses in the form of an event log. The storage module or one of the storage modules may also provide the further modules with functions for calling-up configuration data that describe, for example, which functions are provided in the respective energy management system, and by which modules these functions are provided. Corresponding configurations may be specified in the course of installation of the energy management system. It is also possible, however, to identify configuration changes by means of a further function that is implemented on the same storage module or on another module, and to adjust the configuration data accordingly.

A storage module may store, in particular, acquisition values, planned energy conversions for individual energy-converting elements and/or the entire controlled facility, and provided control parameters, in the form of an event log. For the said data values, and any other data values, a history, or chronological sequence, may be stored.

The energy management system may comprise, as at least one of the modules, a communication module that provides to at least one other of the modules at least one function for communicating with at least one facility that is external to the energy management system. A communication module may serve to communicate with a facility of an external service provider, for example via the Internet, and/or for connecting to an element of the controlled facility, and provide corresponding functions. The external service provider may be, in particular, an energy supplier. In particular, information about energy costs, maximum available outputs, remunerations for feedback of energy into the energy supply grid, or for flexibilities of energy consumption or similar may be exchanged with an external service provider.

If the communication is used to connect to an element of the controlled facility, the communication module may serve, in particular, as an "intermediate station", or abstraction layer, in the acquisition of acquisition values, or in the provision of control parameters. The modules may communicate with one another in a network and, via the communication module, a link may be made to a further network that is assigned to the controlled facility. For examples, elements of the controlled facility may communicate via a BACnet-based or OPC UA protocol-based network, and the modules may communicate with one another via TCP/IP and SOAP. In this case, the communication module may provide functions for protocol or network implementation to the further modules.

Additionally or alternatively, the energy management system may comprise, as at least one of the modules, a prognosis module that provides to at least one other of the modules at least one function for predicting at least one future value for an operating parameter of the controlled facility, wherein the operating parameter is determined by influences outside of the energy management system and the controlled facility. Corresponding functions may be used, in particular, by the planning function or one of the planning functions. For example, the predicted operating parameter may describe the weather, for example an external temperature, a wind speed and/or a weakening of the incident solar radiation as a result of cloud cover. Corresponding operating parameters are relevant, in particular, for energy-converting elements, for example a photovoltaic installation or a wind power installation. However, they also influence the operation of energy-converting elements that are used for air-conditioning, for example air-conditioning systems and heating systems. Alternatively or additionally, it would be possible, for example, to predict a quantity, or a demand for electricity, or arrival times of electric vehicles to be charged that are charged by energy-converting elements of the controlled facility.

The energy management system may comprise, as one of the modules, a statistics module, which evaluates historical variations, stored in particular by a storage module, of operating parameters of the controlled facility, in order to predict a future value of the corresponding and/or a further operating parameter. In particular, the statistics function may take into account times of day and/or weekdays in the evaluation of the historical variation.

As part of the planning of a future energy conversion by the planning function and/or the provision of a control parameter by the control function, it is possible to implement optimization tasks, which may depend on a multiplicity of parameters. Since corresponding optimizations can be computationally intensive, are relatively complex and may have to be provided for a plurality of functions, it is advantageous if at least one optimization function is provided as a separate function in the energy management system. In particular, the energy management system may comprise, as at least one of the modules, an optimization module that provides to at least one other of the modules at least one function for optimizing, dependent on at least one predefined boundary condition, at least one operating parameter that relates to the energy conversion of the controlled facility. It may be predefined as a boundary condition, for example, that, in an industrial plant, for a predefined production quantity, an energy consumption be minimized, and/or that energy generated by energy-generating elements of the controlled facility be used, insofar as possible, by others of the energy-converting elements, in order to minimize a feedback of energy into the energy supply grid, and/or that the energy costs be minimized in consideration of further boundary conditions. The provided optimization function may be realized, in particular, for multi-factor optimization, i.e. to optimize a plurality of factors simultaneously. This is possible, for example, by minimizing or maximizing a weighted sum over a plurality of factors.

The energy management system may comprise, as at least one of the modules, an operating module that provides to at least one other of the modules at least one function for outputting data to a user via an output device, and/or that acquires user inputs to an operating means, and that is designed to call up at least one function of at least one other of the modules in dependence on the operating inputs. In particular, display screens, but also printers, may be used as output devices. User inputs may be acquired by a keyboard, a mouse, switches, keys or similar.

Other embodiments provide a computer software product, comprising a plurality of differing computer programs, wherein, in the case of the computer programs being executed on respectively at least one processor unit and these processor units being interconnected in a communication network, the interconnected processor units realize an energy management system, wherein the processor units each constitute a module that provides at least one function of the energy management system, wherein each of the modules is designed to communicate with respectively one other of the modules via the communication network, whereby functions of the module can be used by the other module and/or functions of the other module can be used by the module. Features disclosed in connection with the disclosed energy management system are applicable in an equivalent manner to the disclosed computer software product.

Other embodiments provide a method for controlling, by an energy management system, a controlled facility that is connected to an energy supply grid and that has a plurality of energy converting elements, wherein the sum of the maximum energy conversions of the elements is at least 3 kW, wherein the energy management system comprises a plurality of modules by which the respectively at least one function used in the course of controlling the controlled facility is provided, wherein there are provided, as functions, at least one planning function by which a future energy conversion of at least one of the energy-converting elements of the controlled facility is planned, at least one acquisition function by which the at least one acquisition parameter that describes an instantaneous energy conversion of at least one of the energy-converting elements is acquired, and a control function by which at least one control parameter that influences an energy conversion of at least one of the energy-converting elements is predefined, wherein each of the modules communicates with respectively at least one other of the modules via a communication link, whereby functions of the module are used by the other module and/or functions of the other module are used by the module.

Features explained in connection with the energy management system or computer software product according to the invention are applicable in an equivalent manner to the method according to the invention.

FIG. 1 shows an exemplary embodiment of an energy management system 1 for controlling a controlled facility 2 that is connected to an energy supply grid, not shown, and that has a plurality of energy converting elements 3, 4, 5. The energy management system 1 comprises a plurality of modules, namely an acquisition module 6, a planning module 7, a control module 8 and a prognosis module 9.

The acquisition module 6 communicates, via a bus or a network, with three measuring means 10, which are each assigned, respectively, to one of the energy-converting elements 3, 4, 5. The acquisition module continuously acquires measurement values provided by the measuring means 10, and holds the current measurement values in an internal storage. The acquisition module 6 additionally provides an acquisition function, by means of which another module, namely the control module 8, can call up held measurement values as acquisition values.

At predefined points in time the planning module 7 plans the energy conversions for the energy-converting elements 3, 4, 5 in such a manner that predefined requirements for the energy conversion of the entire controlled facility can be fulfilled. Stored locally in the planning module 7, besides a planned time progression of the energy conversion of the energy-converting elements for a future planning interval, is the planned time progression of the energy conversion for an instantaneously realized planning interval. In the planning operation, the planning module 7 accesses a plurality of prognosis functions that are provided by the prognosis module 9 and that provide the predicted future values for an operating parameter of the controlled facility. If the energy-converting elements 3 is, for example, a photovoltaic installation, an incident solar radiation or, already directly, a prospective progression of the energy provided by the energy-converting elements 3 may be provided, as a return value of a planning function, by the prognosis function.

The control module 8 provides a control function that is automatically called up periodically in order to specify, or adjust, control parameters for the energy-converting elements 3, 4, 5.

The specification of the control parameters is to be effected in such a manner that an energy conversion for the controlled facility that is planned by the planning function is achieved as exactly as possible. For this purpose, as part of the control function, an information function of the planning module 7, which sends back an energy conversion of the energy-converting elements 3, 4, 5 that is planned for the instantaneous operating instant, is first called up. Additionally called up is an acquisition function of the acquisition module 6, which sends back the instantaneous actual energy conversion of the energy-converting elements 3, 4, 5. In the simplest case, the values acquired by the measuring means 10 and stored temporarily in the acquisition module 6 are returned. However, the acquisition function may additionally execute data processing in order to calculate the returned acquisition value from the measurement values.

From the values provided by the acquisition function and the information function, the control function may determine a discrepancy between the planned energy conversion and the instantaneous actual energy conversion, and provide control parameters that control the energy-converting elements 3, 4, 5 in such a manner that the actual energy conversion approximates to the planned energy conversion. In the simplest case, the control may be effected in such a manner that the energy conversion of each individual element of the energy-converting elements 3, 4, 5 is adjusted to the energy conversion planned for this energy-converting element 3, 4, 5. Frequently, however, if an energy conversion planned for one of the elements 3, 4, 5 is exceeded, or not attained, it is expedient to adjust control parameters of another of the energy-converting elements 3, 4, 5, in order to adjust the energy conversion thereof. If, for example, energy provided by a photovoltaic installation is less than planned, a load, for example an air-conditioning system, may be controlled in order to reduce the energy conversion thereof. FIG. 2 shows a further exemplary embodiment of an energy management system 11 for controlling a controlled facility 12 that is connected to an energy supply grid, not shown. A substantial difference in comparison with the energy management system 1 shown in FIG. 1 is that the modules of the energy management system 11 shown in FIG. 2 communicate via a common communication network 13, which provides the communication links between the individual modules. The communication network 13 is TCP/IP-based. The modules of the energy management system provide their functions, via the communication network 13, as functions that can be called up via a network, for example via SOAP.

Just like the acquisition module 6 explained in connection with FIG. 1, the acquisition module 14 serves to acquire at least one instantaneous energy conversion of at least one of the energy-converting elements 3, 4, 5. The acquired acquisition parameter is provided by an automation means 15 assigned to the controlled facility 12. The automation means 15 assumes the basic data acquisition and control tasks for the energy-converting elements 3, 4, 5. Acquisition values are provided via a network, on the automation means side, having a network protocol, for the purpose of automation, for example BACnet or OPC UA. In order to provide these acquisition values for the acquisition means 14, the energy management system 11 comprises a communication module 16, which provides a communication function for communicating with the automation means 15. Specifically, the communication module 16 transposes requests of the acquisition module 14 for the acquiring of acquisition values, which were received via the communication network 13, to the network on the automation means side, and forwards them to the automation means 15. Responses of the automation means 15 are provided, in turn, to the acquisition means 14. Via the communication module 16, the acquisition function provided by the acquisition module 14 requests acquisition values from the automation means 15, and optionally processes them further, in order to determine a respective energy conversion for the energy-converting elements 3, 4, 5.

The acquisition module 14 does not comprise a data storage of its own for storing acquisition values, but calls up a storage function provided by the storage module 17. A storage function for event logging, which provides the acquisition values, or the calculated energy conversions, with a time stamp and writes them into a storage of the storage module, is used as a storage function. In the storage module 17, volatile and/or non-volatile storages may be used for storing data.

The control module 18 provides a periodically called-up control function that, in dependence on acquired acquisition values and a previously effected planning of the future energy conversion, provides control parameters for the energy-converting elements 3, 4, 5. The basic procedure corresponds to the procedure explained in connection with FIG. 1 relating to the control module 8. For the purpose of determination of the control parameters by the control function, however, use is made of the fact that the energy management system 11 has a storage module 17. As already explained, acquisition values provided with time stamps are stored in the storage module 17. In addition, an energy conversion of at least one of the energy-converting elements 3, 4, 5, and a total energy conversion of the controlled facility, is determined by the planning module 19, and stored in the storage module 17 by use of a further storage function of the storage module 17. The further storage function stores planning data in a database of the storage module in order to facilitate access to the planning data.

For the purpose of determining the control parameter, call-up functions that are provided by the storage module 17 are called up by the control function, in order to read out from the storage module 17 the current acquisition values and the planned energy conversions for the instantaneous operating time-point.

As explained in connection with FIG. 1, a control parameter is determined from these values. As a result of calling-up of a communication function of the communication module 16, this control parameter is transmitted to the automation means 15, which controls the controlled facilities 3, 4, 5 for the purpose of adjusting the respective control parameter.

The planning function of the planning module 19 is called up at predefined points in time. For the purpose of planning the energy conversion during a future time interval, a statistics function of the prognosis module 20, which evaluates a history of the energy conversion of the energy-converting elements 3, 4, 5, is first called up. For this purpose, the statistics function calls up a call-up function of the storage module 17, in order to read out a historical progression, or time progression, of the acquisition values from the event log into which they were previously written as a result of a storage function having been called up by the acquisition function. By means of a statistical evaluation of these data, taking account of the time of day and the day of the week, a typical time progression for the energy conversions of the energy-converting elements 3, 4, 5 in the planning interval is provided.

For the purpose of adjusting this typical progression to external circumstances, the planning function calls up a prognosis function, which is provided by the prognosis module 20 and which predicts at least one operating parameter of the controlled facility that is external to the facility and external to the energy management system, for example an expected incident solar radiation, in order to predict the energy conversion of the energy-converting element 3, which is a photovoltaic installation. For the prognosis of the prospective incident solar radiation in the planning interval, the prognosis module 20 uses a communication function of the communication module 21, by means of which weather information is called up by an external service provider 22, for example via the Internet. The time progression of the predicted operating parameter is provided as a return value to the planning function. In a development of the energy management system, further operating parameters may be predicted, or further information may be acquired from external sources via the communication means 21, for example price information for consumption from, or provision of energy to, the energy supply grid.

In order to determine an optimum planned time progression of an energy conversion in the planning interval in dependence on the predicted operating parameters and a typical progression of the energy conversion, the planning function uses a optimization function, which is provided by the optimization module 21. For example, the planning may be effected in such a manner that a minimum of energy is drawn from the energy supply grid, or that an amount of energy generated by an energy-generating element is utilized as fully as possible by the controlled facility. Alternatively or additionally, it would be possible, for example, to minimize costs for an amount of energy procured from the energy supply grid. The planning data provided by the optimization function are then stored, in that a storage function of the storage module 17 is called up by the planning function. In addition, the planning module 19, by using a communication function of the communication module 21, transmits the planning data to an external facility 26 that is assigned to the energy supply grid, in order to inform an energy supplier in good time about a prospective progression of the energy conversion of the controlled facility.

The energy management system 11 provides a multiplicity of items of information about the operation of the controlled facility. Moreover, it is possible for individual functions of the energy management system, for example in which form the planning data are optimized, to be adjusted. An operating module 23, which acquires inputs to an operating means 24, for example a keypad, and which can represent on a display device 25 information provided by the energy management system 11, is therefore provided in the energy management system 11. The operating module 23 may represent on the display device 25, in particular, a graphical user interface that can be operated by the operating means 24, and that provides the user with possibilities for adjusting a configuration of the energy management system 11, adjusting planning data provided by a planning function, changing or specifying individual control parameters, selecting optimization objectives for the optimization function, or similar. Corresponding functions, which are provided by the energy management system 11, are then called up in dependence on the operating input.

The energy management system shown is of a modular structure. For example, it is possible to add further modules that provide additional optimization, acquisition, prognosis, statistics, storage, operating or communication functions. Moreover, individual modules may be exchangeable. For example, instead of the control module 18 and the acquisition module 14, the acquisition module 6, explained in connection with FIG. 1, and the control module 8 may be used to directly acquire acquisition data from measuring means 10, or to control the energy-converting elements 3, 4, 5. The configuration module 27 is therefore provided in order to provide the individual modules with information about which functions are available in the energy management system 11, the configuration module 27 being a storage module that exclusively allows configuration data to be called up by the other modules. The data stored in the configuration module are stored in the configuration module 27 during a first configuration in the construction of the energy management system. Modules may use a configuration interrogation function of the configuration module 27 to determine which functions of a particular type, i.e. for example which prognosis functions, are available, whether a particular function is available, and by which module a particular function is provided.

FIG. 3 shows a third exemplary embodiment of an energy management system for controlling a controlled facility. The energy management system according to FIG. 3 is more complex than the energy management systems shown in FIGS. 1 and 2, for which reason the communication between the modules of the energy management system is indicated merely schematically. A controlled facility 28, which has a photovoltaic installation as an energy-converting element 3, a battery as an energy-converting element 4, and a load as an energy-converting element 5, is controlled by the energy management system 29. The energy-converting elements 3, 4, 5 are controlled by an automation means 42, which communicates with the energy-converting element 3 via a digital interface 44, and with the energy-converting element 4 via a protocol converter 45 to a different digital protocol. The energy-converting element 5 is controlled, and an energy conversion of the energy-converting element 5 is acquired, by means of an analog input/output interface 43. The communication between the automation means 42 and the energy management system 29 is effected by a communication module 31, which is assigned to the energy management system 29 and which provides protocol conversion as a function. The communication between the communication module 31 and the automation means 42 is effected via BACnet, and the communication between the communication module 31 and the other modules is effected via SOAP.

A first group of modules constitutes a client system 30, which is disposed locally in the region of the controlled facility and provides functions exclusively for the controlled facility 28. The client system 30 comprises a planning module 33 that, like the planning modules 7, 19 explained in connection with FIGS. 1 and 2, plans future energy conversions of the energy-converting elements and of the entire controlled facility. As explained in connection with the acquisition module 14, acquisition values provided by the automation means 42 via the communication module 31 are acquired by an acquisition module 32. As explained in connection with the control module 18, a control module 34 controls the automation means 42 via the communication module 31. An operating module 36, which corresponds to the operating module 23 explained in connection with FIG. 2, is provided for outputting information and for acquiring operating inputs.

An environment simulation module 37 may optionally be provided in the client system 30, which module provides the functions for controlling a simulation system, not shown, by which individual or all energy-converting elements 3, 4, 5 can be simulated for the purpose of testing the energy management system when the energy management system 29 is not connected to the controlled facility 28. The client system 30 additionally comprises a communication module 35 by which, on the one hand, communication is made possible with services, not shown, that are external to the energy management system and external to the facility, for example services assigned to the energy supply grid, and by which, on the other hand, a network communication is effected with the other modules explained in the following.

The modules not accommodated in the client system 30 are addressed in the energy management system 29, via functions of the communication module 35, via an external network, for example a VPN or the Internet.

These modules are divided into two groups, namely, the storage modules 38 and the modules 42 providing external functions. The modules addressed via the external network may be used jointly by a plurality of energy management systems of a plurality of controlled facilities. They may be provided, in particular, by one or more service providers.

Provided as storage modules 38 are a database module 39 that provides a database functionality for storing planning data and/or acquisition data, an event logging module 40 that can collect acquisition data, with time stamps, and other status data of the energy management system 29, and a configuration module 41 that corresponds functionally to the configuration module 27 according to FIG. 2.

Provided as modules 42 that provide external functions are a weather forecasting module 43 that collects and provides weather forecast information, a photovoltaic forecasting module 44 that uses the functions of the weather forecasting module 43 and that, by simulation processes, can forecast an energy conversion of the photovoltaic module, as well as other operating parameters of the photovoltaic module, and an energy gateway module 47 that is realized as a communication module for communicating with a system assigned to an energy provider, to enable planning data to be provided to an energy provider and to enable the planning data to be adjusted in dependence on data provided by the energy provider. A future load profile is predicted, as has been explained in FIG. 2 in relation to the statistics function, by a statistics module 45, by evaluation of historical data that are determined by communication with the event logging module 40, the database module 39 or other sources. By communication with relevant electric vehicles in the vicinity of the controlled facility, a prognosis module 46 for electric vehicles can be used to predict when which of the electric vehicles arrive at the controlled facility, whether these vehicles are expected to use the controlled facility to charge the electric vehicle, and what quantity of energy is required to charge these vehicles.

Further statistics modules, not shown, which, by statistical evaluation, predict a prospective progression of the energy conversion of the controlled facility for the next 30 days and/or for the next year, could be provided as further modules 42 providing external functions. Moreover, a module that predicts the thermal capacities of the controlled facility, or the quality of a vacuum in the controlled facility, and that thus enables inferences to be drawn concerning quantities of energy required for air-conditioning, or for maintaining a vacuum, may be provided as a prognosis module.

Owing to the numerous statistics modules and prognosis modules used in the energy management system 29, very extensive and complex data records are available to the planning module 33 for planning a future energy conversion. An optimization of this planning is relatively computationally intensive, but only has to be performed at particular times. It is therefore advantageous for the optimization of a time progression of the future energy conversion to be swapped-out, at least partly, into the optimization module 48, which functionally corresponds substantially to the optimization module 21 described in connection with FIG. 2.

Although the invention has been illustrated more fully and described in detail on the basis of the preferred exemplary embodiment, the invention is not limited to the disclosed examples, and other variations may be derived therefrom by persons skilled in the art, without departure from the protective scope of the invention.

What is claimed is:

1. An energy management system for controlling a controlled facility that is connected to an energy supply grid and that has a plurality of energy converting elements, wherein the sum of the maximum energy conversions of the energy-converting elements is at least 3 kW, the energy management system comprising:
a plurality of modules, each providing at least one function used in controlling the controlled facility,
wherein the at least one function comprises at least one of (a) at least one planning function for planning a future energy conversion of at least one of the energy-converting elements, (b) at least one acquisition function for acquiring at least one acquisition parameter that relates to an instantaneous energy conversion of at least one of the energy-converting elements, or (c) at least one control function for specifying at least one control parameter that influences an energy conversion of at least one of the energy-converting elements,
wherein each module is configured to communicate with at least one other of the modules via a respective communication link, whereby each respective module is configured to use at least one function provided by at least one other module communicatively linked to that respective module.

2. The energy management system of claim 1, comprising:
at least one acquisition module configured to provide at least one of the at least one acquisition functions,
at least one planning module configured to provide at least one of the at least one planning functions, and
a control module configured to provide at least one of the at least one control functions.

3. The energy management system of claim 1, wherein the separate modules are embodied by separate hardware component parts.

4. The energy management system of claim 3, wherein the communication link comprises a communication network, wherein each module comprises a communication unit for connecting to the communication network.

5. The energy management system of claim 4, wherein at least three of the modules communicate via the communication network.

6. The energy management system of claim 1, wherein at least one of the modules comprise a storage module that provides to at least one other module functions for at least one of storing data or calling-up data.

7. The energy management system of claim 1, wherein the at least one of the modules comprise a communication module that provides to at least one other module at least one function for communicating with at least one facility external to the energy management system.

8. The energy management system of claim 1, wherein the at least one module comprises a prognosis module that provides to at least one other module at least one function for predicting at least one future value for an operating parameter of the controlled facility, wherein the operating parameter is determined based on influences outside of the energy management system and the controlled facility.

9. The energy management system of claim 1, wherein the at least one module comprises an optimization module that provides to at least one other module at least one function for optimizing, based on at least one predefined boundary condition, at least one operating parameter that relates to the energy conversion of the controlled facility.

10. The energy management system of claim 1, wherein the at least one of the module comprises an operating module that (a) provides to at least one other module at least one function for outputting data to a user via an output device, or (c) acquires user inputs to an operating unit and calls up at least one function of at least one other module based on the user inputs.

11. A computer software product for controlling a controlled facility that is connected to an energy supply grid and that has a plurality of energy converting elements, wherein the sum of the maximum energy conversions of the energy-converting elements is at least 3 kW, the computer software product comprising a plurality of computer programs stored in non-transitory computer-readable media and executable by one or more processor units interconnected in a communication network, the interconnected processor units providing an energy management system,
wherein each processor unit constitutes a module that provides at least one function of the energy management system,
wherein each module is configured to communicate with at least one other module via the communication network, whereby each respective module is configured to use at least one function provided by at least one other module communicatively linked to that respective module.

12. A method for controlling, by an energy management system, a controlled facility that is connected to an energy supply grid and that has a plurality of energy converting elements, wherein the sum of the maximum energy conversions of the elements is at least 3 kW, wherein the energy management system comprises a plurality of modules each providing at least one function used in controlling the controlled facility, wherein the functions include at least one planning function for planning a future energy conversion of at least one of the energy-converting elements, at least one acquisition function for acquiring at least one acquisition parameter that describes an energy conversion of at least one of the energy-converting elements, and a control function for predefining at least one control parameter that influences an energy conversion of at least one of the energy-converting elements, the method comprising
each of the modules communicating with at least one of the other modules via a respective communication link, and
each module using at least one function provided by at least one other module communicatively linked to that respective module via the respective communication link.

* * * * *